United States Patent [19]
Bernard

[11] 3,717,322
[45] Feb. 20, 1973

[54] SHUTTER VALVES FOR HIGH-VACUUM APPLICATIONS

[75] Inventor: Rene George Bernard, Lyon, France

[73] Assignee: Societe D'Etudes Verrieres Appliquees, S/Seine, France

[22] Filed: Oct. 27, 1970

[21] Appl. No.: 84,426

[52] U.S. Cl. ..................251/61, 251/76, 251/167, 251/175
[51] Int. Cl. ..........................F16k 31/14, F16k 3/10
[58] Field of Search....137/DIG. 2; 251/76, 167, 175, 251/65

[56] References Cited

UNITED STATES PATENTS

| | | |
|---|---|---|
| 1,826,941 | 10/1931 | La Mont..........................251/175 X |
| 3,524,467 | 7/1970 | Worley...........................251/175 X |
| 1,479,724 | 1/1924 | MacIsaac.......................137/DIG. 2 |
| 2,599,828 | 6/1952 | Hay.................................251/167 |

*Primary Examiner*—Arnold Rosenthal
*Attorney*—Arnold Robinson

[57] ABSTRACT

A shutter valve primarily intended for high-vacuum use includes a housing and a valve disc which can be rolled by two actuators between two positions. In one position the valve is fully open and the other fully closed. In the closed position the valve disc is inflated through a flexible pipe which winds around the periphery of the disc. The inflation action ensures tight closure against the structure defining inlet and outlet openings of the valve body.

10 Claims, 3 Drawing Figures

SHUTTER VALVES FOR HIGH-VACUUM APPLICATIONS

BACKGROUND OF THE INVENTION

1. Field of the Invention

The present invention relates to shutter valves.

2. Description of the prior art

The shutter of a shutter valve has to be displaced over a distance in excess of the effective flow path of the valve and the actuating mechanism of the shutter is therefore bulky. This inevitable bulk is particularly troublesome when the valve is required to operate under temperature, cleanliness or corrosion conditions which on the one hand prevent the actuating mechanism being disposed within the valve housing and on the other hand prevent rendering the valve watertight by means of elastomer materials. Generally, the shutter is connected to an actuating mechanism by a rod or beam enclosed in a resilient metallic bellows, the stroke of which is greater than the effective flow path of the valve.

The lower ( or internal) surface of the metallic bellows is substantial because of the large number of corrugations which are comprised in this bellows, and can have a value equal to three times that of the internal surface area of the housing of the valve.

This important value of the internal surface area is a particular disadvantage in the case of a low-vacuum valve, since the vacuum obtainable is higher with low surface area within the valve because of the degasification effect of the valve walls which becomes apparent when the valve is used under vacuum conditions.

SUMMARY OF THE INVENTION

According to the present invention there is provided a shutter valve comprising a housing having inlet and outlet openings, a shutter member within the housing and arranged selectively to close and open the inlet and outlet openings, a first externally-disposed actuating member for displacing the shutter member by rolling from the closed position to the open position, and a second externally-disposed actuating member for displacing the shutter member by rolling from the open position to the closed position.

BRIEF DESCRIPTION OF THE DRAWINGS

Two embodiments of valves in accordance with the invention will now be described, by way of example, with reference to the accompanying diagrammatic drawings, in which.

DESCRIPTION OF THE PREFERRED EMBODIMENT

Figure 1:
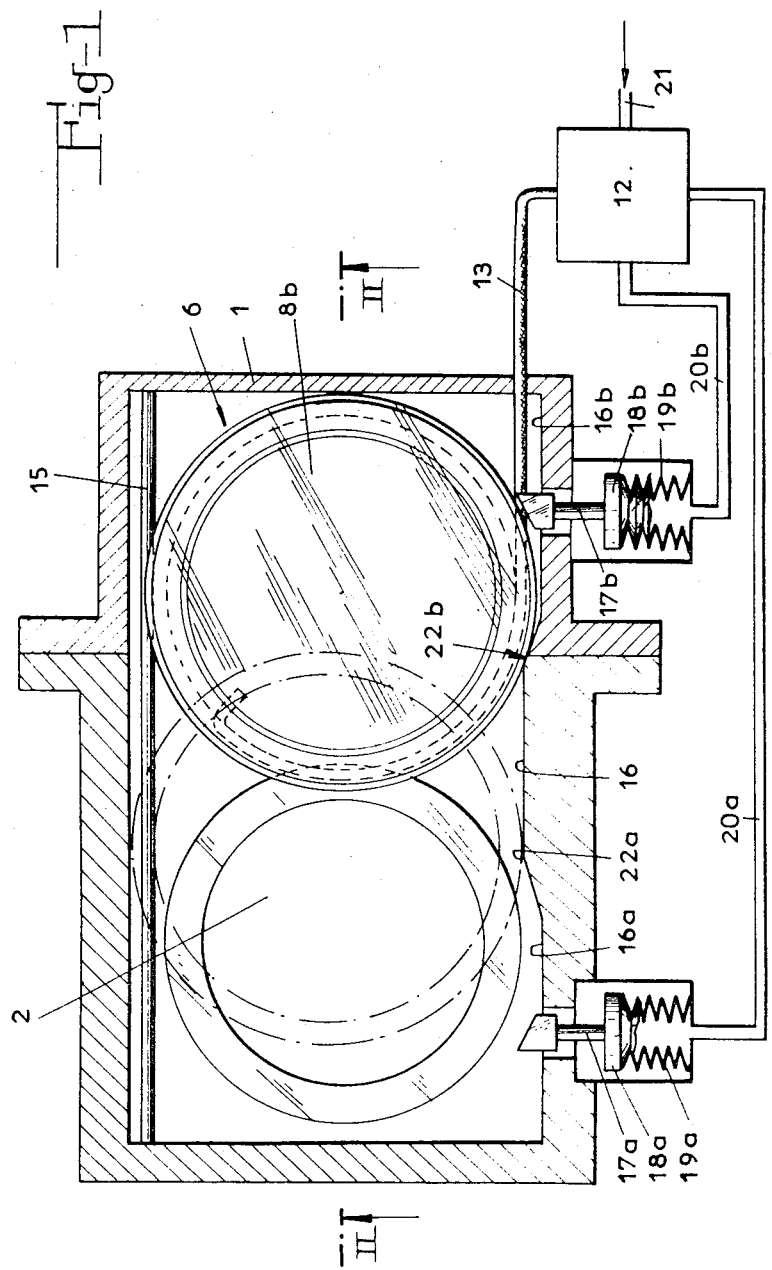
FIG. 1 is a vertical section of a first embodiment of the valve in accordance with the invention.
Figure 2:
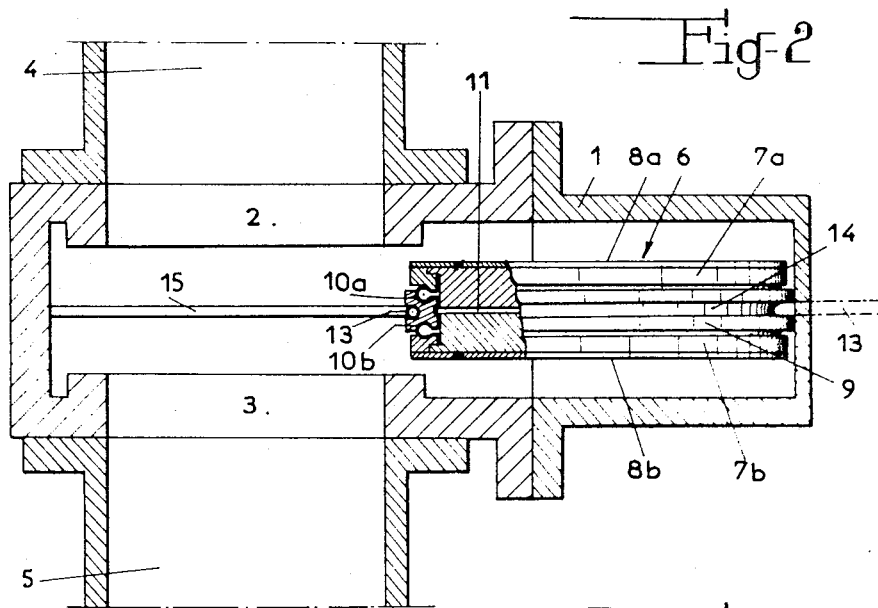
FIG. 2 is a horizontal section on the line II—II of FIG. 1.

As is illustrated in FIGS. 1 and 2, the valve in accordance with the invention comprises a body or housing 1 in the form of a right parallelepiped. The housing 1 has at one lateral end two co-axial openings 2 and 3 respectively communicating with pipes 4 and 5 ( only part shown).

An inflatable circular shutter 6 is adjustably mounted within the housing 1. This shutter includes two discs 7a and 7b which are provided, on their respective outer faces, with a metallic fluid-tight seal 8a, 8b respectively, and are connected to an intermediate member 9, by means of a resilient bellows 10a, 10b respectively, for example a metallic bellows of cross-section similar in shape to a capital omega. The member 9 has an external annular groove 14.

An internal space 11 lying between the two discs 7a, 7b communicates with a source of compressed air through the intermediary of a four-way valve 12 having three positions of adjustment and with a flexible metallic tube 13 partially engaged in the annular groove 14. A circular section rod 15 engages in the upper part ( as shown ) of the groove 14 and so guides the shutter that its median plane lies exactly in the vertical medium plane of the valve and that the seals 8a and 8b do not come into contact with seatings as the shutter rolls.

When the shutter 6 lies opposite the openings 2 and 3 the space 11 is placed in communication with the compressed air or hydraulic fluid source, the shutter inflates and the seals 8a and 8b come into contact with the internal walls defining these openings and close them.

The shutter 6 rests on the lower internal face 16 of the housing 1 on which it can roll. This lower face comprises two spaced depressions 16a and 16b in which the shutter can be located and which determines the equilibrium positions of this shutter. A recess 16a is so formed that when the shutter is partly accommodated by it, it will lie opposite the openings 2 and 3 and thus close them. However, when the shutter is engaged in a recess 16b, it is fully disengaged from the openings 2 and 3.

Pusher rods 17a, 17b are respectively vertically movable into and out of the recesses 16a, 16b; each of these push rods is rigid with a disc 18a, 18b respectively secured to a metallic bellows 19a, 19b thus defining a chamber communicating through a pipe 20a, 20b respectively with the valve 12. An air supply pipe 21 is connected to the valve 12.

The stroke of the push-rods is very small in comparison with the effective flow path diameter of the valve and the diameter of the bellows is very much smaller than if these bellows had to seal an actuating rod or beam. The internal surfaces of the bellows is thus very much smaller than those of the bellow of a conventional shutter valve.

The stroke of the push-rods 17a, 17b is sufficient to disengage the shutter 6 from the respective recess 16a, 16b in which it is engaged at any given time, so that the center of gravity of the shutter passes beyond the limit 22a, 22b of the respective recess, and gives it an impulse which causes it to roll until it falls into the other recess. Thus, when the valve for example is open, it suffices to actuate the push-rod 17b in order to disengage the shutter from the recess 16b and cause it to roll until it reaches the closure position. Compressed air is then delivered through the pipe 13, causing the shutter to inflate and thus close the valve.

Figure 3:
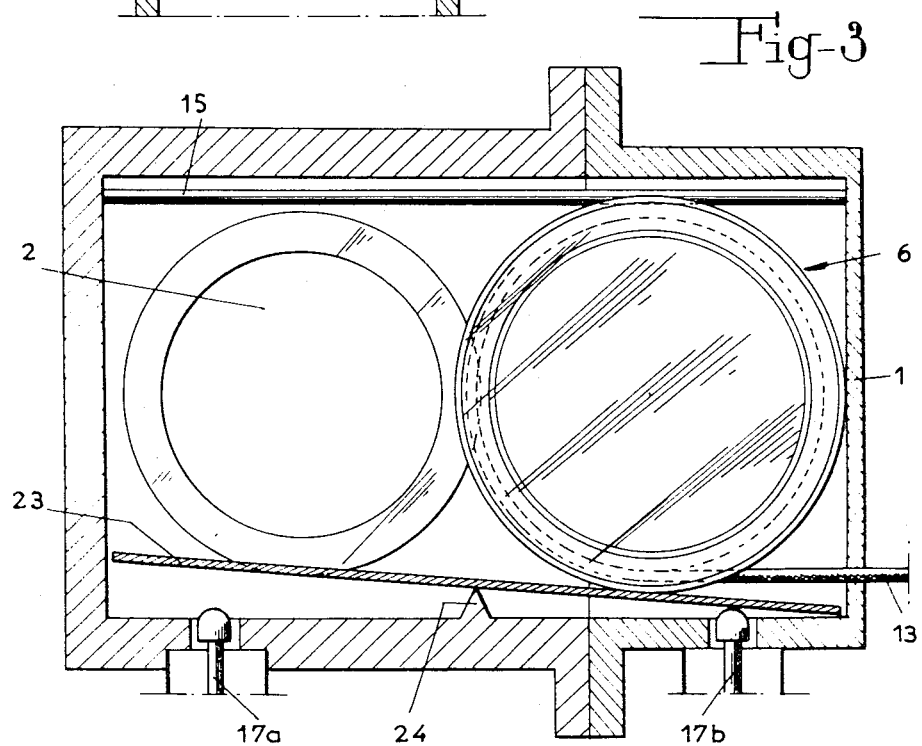
FIG. 3 is a view similar to FIG. 1 of another embodiment.

In the embodiment of FIG. 3 the base of the housing is horizontal, but the shutter lies on an auxiliary inclined wall 23 which is pivotally mounted in the lower part of the housing 1 about a horizontal knife edge 24.

The push-rods can act on the pivotal wall 23. When the valve is open, and the push-rod 17b is actuated, the latter causes the wall 23 to pivot and raise the shutter 6, so that the shutter rolls on the wall and arrives at the closure position where it maintains the wall 23 in the tilted position.

What I claim is:

1. A shutter valve comprising a housing having inlet and outlet openings, a shutter member within said housing arranged to selectively close and open said inlet and outlet openings, externally disposed actuating means unattached to said shutter member to cause said shutter member selectively to roll from the closed position to the open position and vice versa, said valve further comprising a fluid pressure source in which the actuating means comprises first and second members and in which there are means defining a first deformable chamber selectively communicable with said fluid pressure source, means defining a second deformable chamber selectively communicable with said pressure fluid source, each said chamber having a movable wall and each respective wall being connected to said respective first and second actuating members.

2. A valve according to claim 1 wherein said externally disposed actuating means comprises a first actuating member for initially displacing said shutter member to cause said shutter member to roll from said closed position to said open position, and a second actuating member for initially displacing said shutter member to cause said shutter member to roll from said open position to said closed position.

3. A valve according to claim 2, wherein said housing has two recesses in an internal surface thereof on which said shutter member is adapted to roll, one recess corresponding to said open and the other to said closed position of said shutter member, and wherein said first and second actuating members are arranged to act directly on said shutter member.

4. A shutter valve comprising a housing having inlet and outlet openings, a shutter member within said housing arranged to selectively close and open said inlet and outlet openings, externally disposed actuating means, a substantially flat auxiliary wall member within said housing, and means for pivoting said auxiliary wall member under the action of said actuating means, said shutter member disposed on said auxiliary wall and disposed to roll edgewise along said auxiliary wall member from the closed position to the open position and vice versa.

5. A valve according to claim 4, wherein said externally disposed actuating means comprises first and second actuating members and said means enabling said auxiliary wall member to pivot, is positioned between said actuating members whereby said first actuating member causes said auxiliary wall to pivot and incline towards said open position, to cause said shutter member to roll from said closed position to said open position and whereby said second actuating member causes said auxiliary wall to pivot and incline towards said closed position, to cause said shutter member to roll from said open position to said closed position.

6. A shutter valve comprising a housing having inlet and outlet openings, a shutter member within said housing arranged to selectively close and open said inlet and outlet openings, and externally disposed actuating means to cause said shutter member selectively to roll from the closed position to the open position and vice versa, wherein said shutter member is inflatable and said valve further comprises
a fluid pressure source, and means for placing the interior of said shutter
member in communication with the source, said means includes a flexible pipe at least partially within said housing said pipe being partially wrapped around said shutter member in at least the open or closed position.

7. A valve according to claim 6 wherein said shutter member has a peripheral groove in which said flexible pipe engages.

8. A valve according to claim 7 comprising a guide rod extending within said housing transversely to said inlet and outlet openings, said guide rod being received in said peripheral groove of said shutter member.

9. A valve according to claim 6 in which the actuating means comprises first and second members and in which there are
means defining a first deformable chamber selectively communicable with said fluid pressure source,
means defining a second deformable chamber selectively communicable with said pressure fluid source,
each said chamber having a movable wall and each respective wall being connected to said respective first and second actuating members.

10. A valve according to claim 9 comprising
a distribution valve,
said chambers being in communication with said fluid pressure source through said distribution valve.

* * * * *

UNITED STATES PATENT OFFICE
CERTIFICATE OF CORRECTION

Patent No. 3,717,322    Dated February 20, 1973

Inventor(s)    Rene G. Bernard

It is certified that error appears in the above-identified patent and that said Letters Patent are hereby corrected as shown below:

On the cover sheet before "[52]" insert:

-- [30] Foreign Application Priority Data

October 29, 1969 France......69 37233--

Signed and sealed this 10th day of July 1973.

(SEAL)
Attest:

EDWARD M. FLETCHER, JR.　　　　　　Rene Tegtmeyer
Attesting Officer　　　　　　　　　Acting Commissioner of Patents